L. FAUST AND E. B. ANDERSON.
AUTOMOBILE LOCKING DEVICE.
APPLICATION FILED OCT. 27, 1919.
1,338,913.
Patented May 4, 1920.
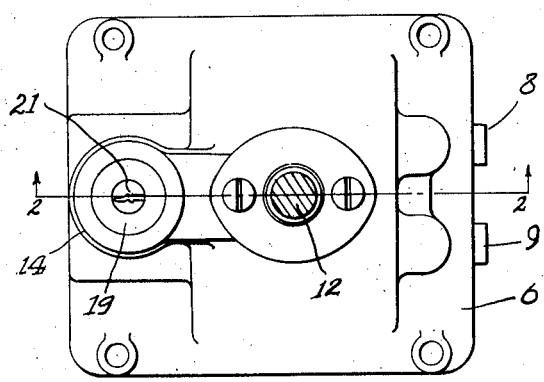
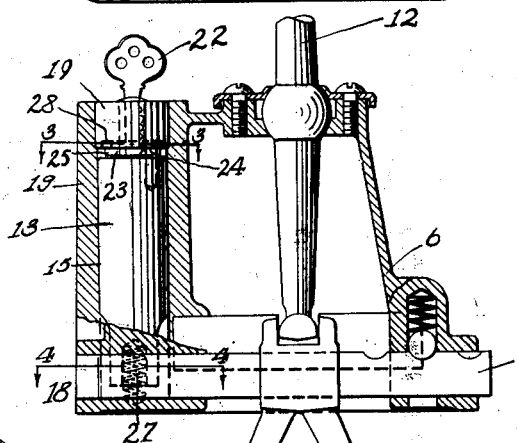
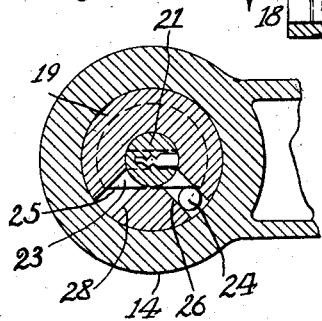
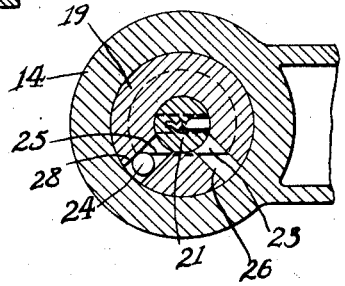
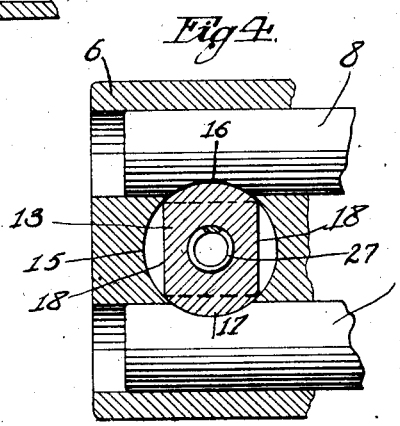
Inventors
Levin Faust,
Edmund B. Anderson,
By Ira J. Wilson
Atty.

UNITED STATES PATENT OFFICE.

LEVIN FAUST AND EDMUND B. ANDERSON, OF ROCKFORD, ILLINOIS, ASSIGNORS TO MECHANICS MACHINE COMPANY, OF ROCKFORD, ILLINOIS, A CORPORATION OF ILLINOIS.

AUTOMOBILE-LOCKING DEVICE.

1,338,913. Specification of Letters Patent. Patented May 4, 1920.

Application filed October 27, 1919. Serial No. 333,553.

*To all whom it may concern:*

Be it known that we, LEVIN FAUST and EDMUND B. ANDERSON, citizens of the United States, residing at Rockford, in the county of Winnebago and State of Illinois, have invented certain new and useful Improvements in Automobile - Locking Devices, of which the following is a specification.

This invention pertains in general to locks and latches, and has more particular reference to devices especially adapted for locking vehicles of various kinds against theft, or operation against the will of the owner.

The primary object is to provide a locking device of such practical and novel construction that it shall fully and satisfactorily meet those requirements which are recognized as insuring a reasonable degree of safety against theft. That is, the locking device shall be operable from the driver's compartment, have no removable parts other than the key, and withstand the efforts of a well informed thief equipped with the tools ordinarily found in a garage for a period of at least twenty minutes.

Another important object resides in the provision of a locking device of the characteristics above mentioned so designed and constructed as to be capable of economical production.

In furtherance of these general objects, our invention contemplates a device employed preferably for locking shiftable parts of the transmission mechanism, and characterized by the inclusion of a locking member adapted to be moved rotatably into and out of locking engagement with one or more shifting rods, a cylinder lock and key, and means whereby these parts coöperate in a novel manner for rotating the locking member through a different number of degrees from that movement of the cylinder lock employed to lock and unlock the device. These features and others and the attendant advantages therefrom will be more fully appreciated hereinafter as the invention becomes better understood by reference to the following description when considered in connection with the accompanying drawing, in which—

Figure 1 is a plan view of an automobile transmission locking device embodying our improvements;

Fig. 2, a vertical sectional view through the same taken substantially on the line 2—2 of Fig. 1;

Fig. 3, an enlarged sectional view taken on the line 3—3 of Fig. 2, showing the parts in the locked position;

Fig. 4, a fragmentary sectional view taken on the line 4—4 of Fig. 2; and

Fig. 5, a sectional view similar to Fig. 3, but showing the parts in unlocked position.

Our improvements are at present exemplified in connection with the shifting mechanism of an automobile transmission, for the purpose of locking one or more of the gear-shifting rods against operation. It should be understood, however, that our improvements are in no way limited to this particular application, but are adapted for the locking of any shiftable or movable element, the operation of which is necessary for running a motor vehicle.

Referring now to the drawing, it will be observed that we have embodied our improvements in the casing of a control set of a change speed transmission mechanism. The control set illustrated is of conventional and well known design, comprising a casing designated generally by character 6, constituting a cover for a transmission casing or box, not shown, and carrying a pair of gear-shifting rods 8 and 9 slidable horizontally in parallel relation and respectively equipped with a gear-shifting fork 11. These rods are adapted to be individually shifted by operation of a hand lever 12 having a ball and socket mounted on the casing 6.

Our invention contemplates locking the rods 8 and 9 against lengthwise shifting movement by means of a locking member 13 mounted in a cylindrical casing section 14 to move lengthwise and rotatably about a vertical axis disposed intermediate the shifting rods. The bore 15 of the casing section 14 intersects the rod bearings, as shown in Fig. 4, and the rods 8 and 9 are respectively formed with concave recesses 16 and 17 coinciding with the bore 15 when the rods are in neutral position. When the locking member 13 is engaged in the recesses 16 and 17 as shown in Fig. 4, the rods 8 and 9 are locked against shifting movement, and when the member 13 is rotated through 90 degrees to bring its milled or cutaway sides 18 opposite said recesses 16 and 17, said rods will be free for shifting movement in either direction. It will thus be seen that the locking engagement between the member 13 and the shifting rods is effected by rotative movement of said member about its longitudinal axis.

In the upper end of the bore 15 is fixedly secured a lock-carrying part designated generally by character 19 carrying preferably a cylinder lock co-axial with the member 13. The key lock *per se* might be of any suitable or preferred construction, and in the present instance is shown simply in outline as comprising a cylinder member 21 and a key 22. This lock is of such construction that the key must be turned a complete revolution in one direction for locking and a complete revolution in the opposite direction for unlocking. In this regard, it will be noted that the locking member 13 must be operated only in movements of 90 degrees, or multiples thereof, to effect locking and unlocking; while the cylinder lock 21 must be moved in complete revolution movements. We have, therefore, provided for a novel connection between the cylinder lock 21 and the locking member 13, whereby the latter will be rotated less than 360 degrees when the cylinder lock is operated, and for reasons of practicability and convenience in construction we prefer that this movement shall be 90 degrees less. To this end, we equip the cylinder lock 21 with a fixed segmental part 23, and the member 13 with an upstanding pin 24 adapted to be engaged by the flat surface 25 of the segmental member. The locked position of the member 13 is maintained by this pin 24 engaging or seating in a recess in the form of a radial slot in the fixed part 19, and the pin is held so seated by the pressure of a spring 27 bearing upwardly against the lower end of the member 13. In this regard it will be noted that when the pin 24 is so engaged the member 13 is capable of movement lengthwise of its axis against the pressure of said spring sufficiently to withdraw the pin from the recess 26 to permit free rotation of the member 13.

The device is shown locked in Figs. 1 to 4 inclusive and to unlock it, the key is inserted in the key-way and pressed down upon the top of the member 13, thereby withdrawing the pin 24 from the recess 26, whereupon the key may be turned a complete revolution in a counter-clockwise direction viewing Fig. 3, to unlocked position. It will be noted that by reason of the segmental shape of the part 23 which transmits key movement to the locking member 13, the first 90 degrees of said key rotation has no effect on the locking member. Consequently, the member 13 will be rotated only 270 degrees, which will position its flat faces 18 opposite the recesses 16 and 17 in the shifting rods, leaving the latter free for operation. At this position the key will be withdrawn, whereupon the spring 27 will raise the member 13 so as to locate its pin 24 in the recess 28 in the part 19, in which position the pin is shown in Fig. 5, this being the unlocked position. To again lock the device, the key will be inserted, thereby withdrawing the pin 24 from the recess 28, and upon turning the key a complete revolution in a clockwise direction, the member 13 will be revolved 270 degrees to the position shown in Figs. 3 and 4, in which it will be permanently retained by the act of withdrawing the key. It will be obvious that the position in which one or more shifting rods are locked is not essential to the present improvements, since one or more rods might be locked in any position to which they are movable.

It is believed that the foregoing conveys a clear understanding of the principles and objects prefaced above, and while we have illustrated in the drawing but a single working embodiment thereof, it should be understood that various changes might be made in construction and arrangement without departing from the spirit and scope of the invention as expressed in the appended claims, in which:

We claim:

1. A transmission lock comprising in combination with a pair of shifting rods, a locking member intermediate said rods and rotatable about a vertical axis into and out of locking engagement therewith, a cylinder lock co-axial with said locking member, and means operative between the cylinder member and locking member for rotating the latter approximately three fourths of a revolution into locked and unlocked positions upon rotation of the cylinder member in complete revolution movements.

2. A transmission lock comprising in combination with a pair of shifting rods, a locking member intermediate said rods and rotatable about a vertical axis into and out of locking engagement therewith, a key cylinder member, a segmental part fixed to the cylinder member, and an upstanding pin on the locking member adapted to be engaged and moved by said segmental part upon rotation of the cylinder member by the key, said segmental member affording a lost motion whereby the locking member rotatably moves less than the cylinder member to and from locked position.

3. A transmission lock comprising in combination with a pair of shifting rods, a locking member intermediate said rods and rotatable about a vertical axis into and out of locking engagement therewith, a key cylinder member, a segmental part fixed to the cylinder member, an upstanding pin on the locking member adapted to be engaged and moved by said segmental part upon rotation of the cylinder member by the key, said segmental member affording a lost motion whereby the locking member rotatably moves less than the cylinder member to and from locked position, a stationary part having a pair of recesses spaced apart circumferentially, a pin on the locking member adapted to engage in one of said recesses when in locked position and the other when unlocked, and to be movable into and out of said engagement by lengthwise movement of the locking member, and a spring for moving the locking member lengthwise in a direction to effect said pin engagement, the locking member being movable in the opposite direction by pressure of the key.

4. In a transmission lock of the character described, the combination of a pair of shifting rods, a locking member intermediate the same and movable rotatably into and out of locking engagement therewith, a cylinder lock co-axial with said locking member, and means operative between the cylinder lock and locking member including overlapping parts associated to permit relative rotative movement and for moving the locking member approximately 270 degrees upon a complete rotation of the cylinder lock.

5. In a transmission lock, the combination of a pair of shifting rods, a locking member intermediate the same and movable rotatably into and out of locking engagement therewith, a cylinder lock co-axial with said locking member, a stationary part in juxtaposition to the cylinder lock and having a pair of circumferentially spaced recesses, said locking member being equipped with a part adapted to enter either one of said recesses, a spring for moving the locking member lengthwise of its axis for engaging said part in said recess, a key for the lock adapted by insertion to press the locking member lengthwise of its axis against said spring pressure to disengage said part from said recess, and means operative between the cylinder lock and locking member, whereby the latter will be moved rotatably by turning the key, whereupon said part will engage in the other recess at a predetermined point in the rotation of the locking member.

6. A locking device of the character described adapted to lock a shiftable element, comprising a locking member movable lengthwise of its major axis and rotatable thereabout, said member by rotatable movement being carried into and out of locking engagement with said shiftable element, a cylinder lock and key, a segmental part fixed to the cylinder, an upstanding pin fixed to the locking member, a stationary part having circumferentially spaced recesses in any of which said pin is adapted to engage, a spring constantly urging said locking member lengthwise of its axis in a direction to engage the pin in one of said recesses, said locking member being depressible by the key to withdraw said pin from a recess, whereupon the key may be turned to rotate said segmental member which in turn engages said pin and rotates the locking member until its pin enters the next recess in its path.

7. A locking device of the character described adapted to lock a shiftable element, comprising a locking member movable lengthwise of its major axis and rotatable thereabout, said member by rotatable movement being carried into and out of locking engagement with said shiftable element, a cylinder lock and key in axial alinement with said locking member and rotatable in complete revolution movements to locked and unlocked positions, said locking member being rotatable to alternately locked and unlocked relation to said shiftable element upon each successive rotation of 90 degrees, and means operative between the cylinder lock and said locking member for rotating the latter approximately 270 degrees upon rotation of said cylinder lock a complete revolution to secure said locked and unlocked effect.

8. A locking device of the character described, adapted to lock a shiftable element comprising a locking member movable rotatably into and out of locking engagement with said shiftable element, a cylinder lock, and means operative between the cylinder lock and locking member for rotating the latter in partial revolution movements into locked and unlocked positions upon rotation of the cylinder lock in complete revolution movements.

LEVIN FAUST.
EDMUND B. ANDERSON.